Feb. 25, 1936.　　　　H. M. CHANCE　　　　2,032,080
APPARATUS FOR VENTILATING BUILDINGS
Original Filed March 2, 1934
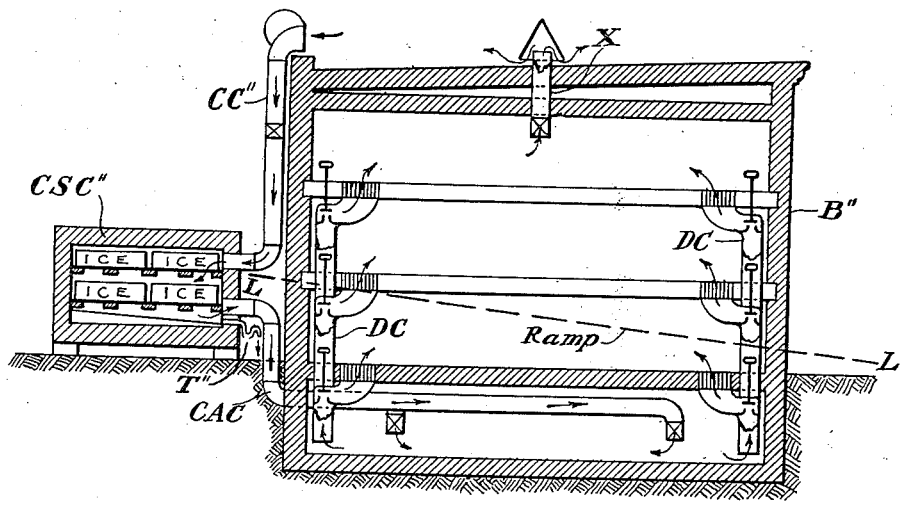
Witnesses:
Carl K. Schulze
Frank H. Mills
Inventor:
Henry M. Chance Patented Feb. 25, 1936

2,032,080

UNITED STATES PATENT OFFICE 2,032,080

APPARATUS FOR VENTILATING BUILDINGS

Henry M. Chance, Philadelphia, Pa.

Continuation of application Serial No. 713,673, March 2, 1934. This application December 28, 1934, Serial No. 759,525

2 Claims. (Cl. 62—26)

My invention consists of apparatus for cooling, conditioning, purifying and ventilating dwellings, factories, assembly halls and the like, by apparatus without moving parts, operated solely by differences in the specific gravity of the air in different parts of the apparatus.

My invention is carried out by causing said air to flow through regions in which it is cooled and purified before being circulated throughout the building. The apparatus also includes provision for storage of cooled air prior to its use to insure an adequate available supply.

Apparatus adapted to carry out my invention will consist of a cold storage chamber with communication to the outside air, and to a conduit or conduits extending through the interior of the building so that air used for ventilation will be cooled by passage through this chamber.

When a beam of sunlight is permitted to enter a room from which other light is excluded myriads of otherwise invisible particles are seen floating in the air. These floating particles consist of many kinds of solid matter some quite harmless while others are disease germs of virulent type.

When air containing such dust particles is cooled down to a temperature at which moisture tends to condense, each of the floating dust particles becomes a nucleus and attracts molecules or moisture, or such particles are bombarded by molecules or atoms of the vapor and become coated with a film of moisture which increases the weight of the particle so that it tends to fall by gravity; the falling particles collide and coalesce with others and finally form drops of water which fall to the earth as rain. After such a shower the air is noticeably clean and pure.

I effect removal from the air of all dust, disease germs and the like by carrying it through a cold storage chamber in which moisture is condensed, repeating within the apparatus the phenomena above described.

The cold storage chamber may be located below ground, above the roof of the building or in any intermediate position.

The drawing illustrates a cold storage chamber CSC" located outside the building B" which is to be ventilated, and at a height midway between the second and third floors and having a capacity to hold four (4) 300 pound cakes of ice. A ramp for filling the chamber with ice is indicated by the dotted line L—L. A trap T" is provided for the discharge of ice water and condensed moisture from chamber CSC". The intake conduit CC" extends above the roof of the building and is equipped with a revolving hood with vane to keep it facing the direction in which the wind is blowing thus assisting the circulating of air through CC", CSC" and the cold air conduit CAC with valve controlled outlets in the basement.

The air in the distributing conduits DC, DC, becoming warmed from the heat of the building, by its buoyancy gradually draws up the cold air accumulated in the basement, aided by the pressure of the downward flowing cold air in CAC, and distributes it to the second and third floors, the building thus being supplied with dry cool air which is of aseptic nature and which, upon becoming warmed within the building, will absorb moisture from damp walls of the interior of the building thus improving its condition both as to comfort and health of those employed or living therein.

A valve controlled discharge from the upper floor through the hooded outlet X provides for the discharge of air contaminated by the exhalations of persons and animals, odors from materials being fabricated, treated, ironed, from machines or chemicals used, etc.

The arrangement of conduits may be varied widely from those shown by the drawing without departing from utilization of the laws controlling the circulation of liquids, fluid gaseous mediums such as air, steam and vapor through conduits, and the rate of flow may be directed and controlled by adjustable valves to regulate the quantity of ventilation desired to be utilized in those parts of the building to be ventilated, as will be understood and readily used by those familiar with the art.

Any room in which no ventilation is desired is closed off to the ventilation system by the valved outlets of the drawing. Cold air which has accumulated in the basement is in readiness for delivery to any room in which ventilation with cooled air is desired, immediately upon the valved outlet to that room being opened.

The structure shown by the drawing is intended to be diagrammatic and replaceable by other equivalent devices by which similar or identical functions can be performed.

The present application is a continuation of the abandoned application Ser. No. 713,673, filed by H. M. Chance on March 2, 1934.

In the following claims, I have further described my invention:

1. The combination with a building having a basement and upper rooms to be ventilated, of apparatus for effecting ventilation comprising a cooling chamber disposed exteriorly of the building and at a height above said basement, means within said chamber for cooling air therein by contact, said chamber having an inlet opening through which external air may be admitted thereto, and having an outlet opening through which cooled air may be discharged, a conduit connecting the outlet opening and the basement of the building for discharging cooled air into the basement for storage, and a conduit connecting the basement with the upper rooms of the building to be ventilated, said last named conduit opening into the basement at the lower portion thereof and apart from the point at which the conduit from the cooling chamber discharges into the basement, the elevated position of said cooling chamber forcing cooled air into the basement by gravitational action and thence upwardly into the rooms.

2. The combination with a building to be ventilated, of apparatus for effecting ventilation comprising a cooling chamber, means within the chamber for cooling air passing therethrough, said chamber having an inlet opening for admitting external air thereto and having an outlet opening for the delivery of cooled air, a conduit leading from said outlet opening to a zone within the building to which cooled air is to be supplied, said chamber being elevated with respect to the lowermost portion of said zone to cause delivery of cooled air by gravitational flow of the cooled air, and an accumulation chamber interposed in said conduit between the cooling chamber and the zone to be cooled, the cooled air entering the accumulation chamber at one point and being delivered therefrom at another point so that cooled air flows through the accumulation chamber or will be stored therein prior to use.

HENRY M. CHANCE.